(12) United States Patent  
Detwiler

(10) Patent No.: US 8,056,810 B2  
(45) Date of Patent: Nov. 15, 2011

(54) METHODS AND APPARATUS FOR GENERATING AND DECODING SCAN PATTERNS USING MULTIPLE LASER SOURCES

(75) Inventor: Paul Oliver Detwiler, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 997 days.

(21) Appl. No.: 11/485,602

(22) Filed: Jul. 12, 2006

(65) Prior Publication Data

US 2008/0011857 A1    Jan. 17, 2008

(51) Int. Cl.
| | |
|---|---|
| G02B 26/00 | (2006.01) |
| G02B 26/12 | (2006.01) |
| G02B 26/08 | (2006.01) |
| G02B 26/10 | (2006.01) |
| H01J 3/14 | (2006.01) |
| H01J 5/16 | (2006.01) |
| H01J 40/14 | (2006.01) |

(52) U.S. Cl. .............. 235/462.38; 250/236; 359/204.1; 359/216.1

(58) Field of Classification Search .. 235/462.38–462.4, 235/462.36, 454; 359/204.1–204.5, 216.1–219.2, 359/217.1–217.4; 250/234–236  
See application file for complete search history.

(56) References Cited

U.S. PATENT DOCUMENTS

| | | | | | |
|---|---|---|---|---|---|
| 3,812,325 | A | * | 5/1974 | Schmidt | 235/454 |
| 4,474,422 | A | * | 10/1984 | Kitamura | 359/204.1 |
| 5,054,930 | A | * | 10/1991 | Adelson | 356/429 |
| 5,173,603 | A | * | 12/1992 | Lindacher | 250/236 |
| 5,268,565 | A | * | 12/1993 | Katoh et al. | 235/462.31 |
| 5,361,158 | A | * | 11/1994 | Tang | 235/462.4 |
| 5,717,221 | A | * | 2/1998 | Li et al. | 250/566 |
| 5,870,132 | A | * | 2/1999 | Inoue et al. | 347/243 |
| 5,892,214 | A | * | 4/1999 | Lindacher et al. | 235/462.32 |
| 5,914,477 | A | * | 6/1999 | Wang | 235/462.1 |
| 5,941,328 | A | * | 8/1999 | Lyons et al. | 180/65.1 |
| 5,975,418 | A | * | 11/1999 | Ishii et al. | 235/462.37 |
| 6,053,409 | A | * | 4/2000 | Brobst et al. | 235/462.36 |
| 6,292,285 | B1 | * | 9/2001 | Wang et al. | 359/204.1 |
| 6,313,906 | B1 | * | 11/2001 | Nagasaka et al. | 355/67 |
| 6,527,184 | B1 | * | 3/2003 | Oliva | 235/462.36 |
| 6,715,685 | B2 | * | 4/2004 | Dvorkis | 235/462.37 |
| 6,788,445 | B2 | * | 9/2004 | Goldberg et al. | 359/204.5 |
| 7,508,562 | B2 | * | 3/2009 | Matsuoka | 359/204.1 |
| 7,611,055 | B1 | * | 11/2009 | Detwiler | 235/440 |
| 2004/0041087 | A1 | * | 3/2004 | Saito et al. | 250/235 |
| 2005/0006476 | A1 | * | 1/2005 | Reichenbach et al. | 235/454 |
| 2005/0051631 | A1 | * | 3/2005 | Hammer | 235/462.4 |
| 2005/0116038 | A1 | * | 6/2005 | Lewis et al. | 235/454 |
| 2006/0023285 | A1 | * | 2/2006 | Lai | 359/216 |
| 2006/0238848 | A1 | * | 10/2006 | Sekine | 359/204 |

* cited by examiner

*Primary Examiner* — Michael G Lee  
*Assistant Examiner* — Suezu Ellis  
(74) *Attorney, Agent, or Firm* — Peter Priest; Harden E. Stevens, III

(57) ABSTRACT

Systems and techniques for multiple laser and multiple detector bar code scanning. multiple laser sources generate multiple laser beams directed to a rotating spinner and along optical paths to emerge from a scanner as multiple scan beams. The scan beams trace out a scan pattern within a scan volume. As the multiple scan beams strike an object within the scan volume, reflected light rays are produced representing reflections of the multiple scan beams. As the reflected light rays enter the scanner, they are directed to a collector and focused onto a plurality of detectors so that reflected light rays representing reflections of each scan beam are focused onto a detector associated with the laser source from which the scan beam originates.

17 Claims, 11 Drawing Sheets

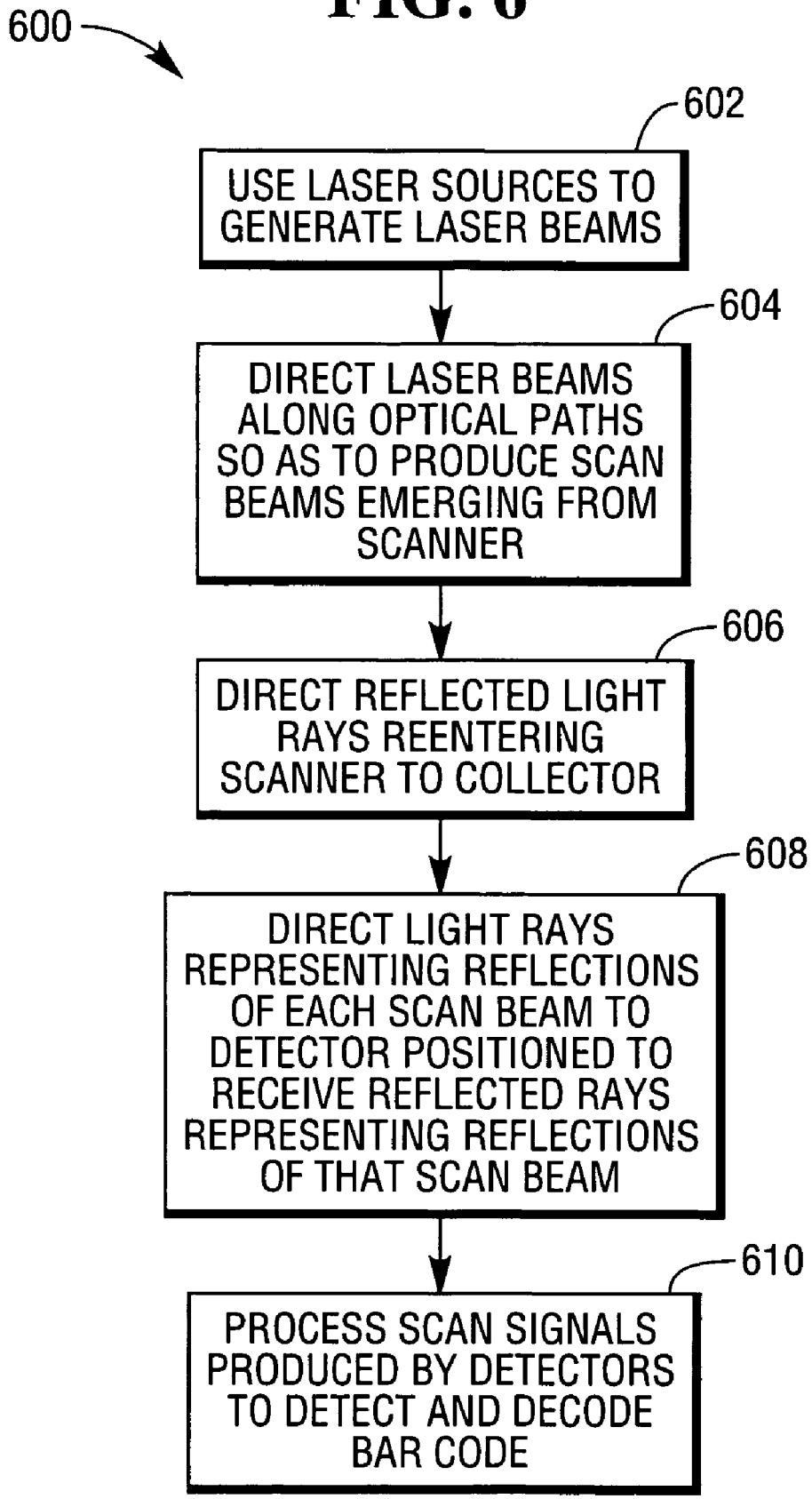

METHODS AND APPARATUS FOR GENERATING AND DECODING SCAN PATTERNS USING MULTIPLE LASER SOURCES

FIELD OF THE INVENTION

The present invention relates generally to improvements to bar code scanners. More particularly, the invention relates to improved systems and techniques for using multiple laser sources to generate scan patterns and using multiple detectors in decoding the reflections of such scan patterns to extract bar code information.

BACKGROUND OF THE INVENTION

Bar code labels that can be read and decoded by bar code scanners are widely used in a variety of applications, providing a mechanism for providing objects with identifying information that can be quickly and easily read using automated equipment. Because reading of the labels is automated, introduction of errors due to incorrect reading or data entry by a human operator is substantially reduced or eliminated. In order to allow for as widespread usage of bar code scanning as possible, it is highly desirable to allow for easy and accurate reading of as wide a variety of labels as possible, including demagnified labels or highly truncated labels.

Efficient reading of highly truncated labels tends to be more easily accomplished if a scan pattern includes a large number of parallel scan lines, in order to insure that one or more scan lines crosses a particular bar code label, regardless of the position and orientation of the bar code in the scan volume produced by a bar code scanner. However, the number of scan lines that can be produced as part of a scan pattern is typically limited. The limit is approximately $4\pi r$, where the value r is the optical distance between the scan zone and a rotating spinner used to reflect a laser beam to produce moving scan lines. In addition, the reading of de-magnified labels, that is, small labels exhibiting a relatively dense encoding of information, typically requires a small laser spot size. However, a scan beam providing a small laser spot size tends to provide only a relatively narrow read range. Numerous other constraints exist that tend to increase the difficulty of generating scan patterns suitable for reading labels of varying sizes and shapes.

SUMMARY OF THE INVENTION

The present invention addresses such difficulties by providing for a scanner employing multiple laser sources and multiple detectors. For example, a scanner according to an aspect of the present invention may include first and second dual laser sources, and first and second dual detectors. The first and second laser sources emit first and second a laser beams that strike a rotating spinner and are directed along an optical path, suitably by optical elements such as pattern mirrors. The optical paths of the first and second laser beams eventually direct the first and second laser beams through a scan window to a scan zone outside the scanner. As they emerge from the scanner, the first and second laser beams are conveniently referred to as first and second scan beams. As the spinner rotates, the scan beams move so as to trace out scan lines. As the spinner rotates so that a facet of the spinner passes in the path of the first and second laser beams, the first and second scan beams trace first and second scan lines, respectively.

When the scan beams strike an object in the scan zone, the light comprising the scan beams is scattered off of the object, and some of this light is typically reflected back into the scanner as reflected light rays. Reflected light rays are directed to the spinner and to a collector, and imaged by the collector onto a set of dual detectors. Because the reflected light rays are reflections of the first and second scan beams, which are in turn the first and second laser beams originating from the first and second laser sources, each light ray may be said to originate from either the first or the second laser source. As the reflected light rays reenter the scanner, they are directed along optical paths within the scanner, typically to the spinner and from the spinner to a collector. The collector focuses the reflected light rays onto first and second dual detectors.

The laser sources are placed and oriented, and the reflected light rays are collected and focused, in such a way that the collector focuses reflected rays representing reflections of the first scan beam onto the first detector and focuses reflected light rays representing reflections of the second scan beam onto the second detector. The laser sources are placed and oriented so that optical paths of the first and second laser beams will diverge sufficiently from one another so that the first and second scan beams will exhibit sufficient separation by the time they reach the scan zone. The separation will be sufficient to allow the reflected light rays representing reflections of the first and second scan beams to experience demagnification typically produced by their optical paths within the scanner, and still be reliably directed to the first and second detectors, respectively.

A more complete understanding of the present invention, as well as further features and advantages of the invention, will be apparent from the following Detailed Description and the accompanying drawings.

BRIEF DESCRIPTION OF THE DRAWINGS

FIG. 6 illustrates a process of scan pattern generation, and collection and detection of light from a scan pattern according to an aspect of the present invention.

DETAILED DESCRIPTION

Figure 1A:
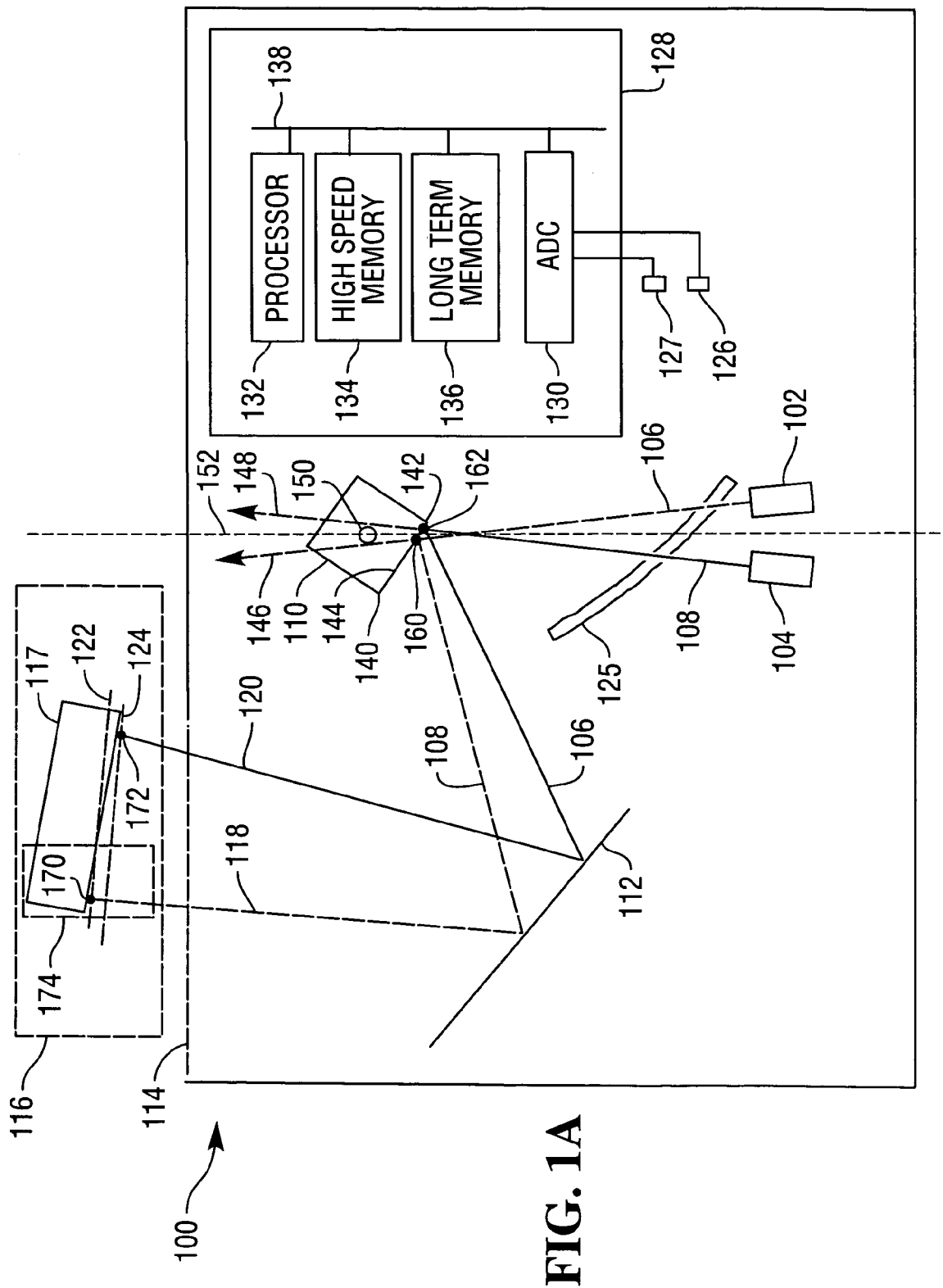
FIG. 1A illustrates a scanner according to an aspect of the present invention, showing laser beams originating from laser sources and directed along optical paths out of the scanner and into a scan zone.

FIG. 1A illustrates a top down view of a scanner 100 according to an aspect of the present invention. The scanner 100 includes first and second laser sources 102 and 104, directing first and second laser beams 106 and 108, respectively, to a rotating multifaceted spinner 110. The spinner 110 deflects the laser beams 106 and 108 to one or more pattern mirrors or sequences of pattern mirrors, of which an exemplary pattern mirror 112 is illustrated here. The pattern mirror 112 directs the laser beams 106 and 108 through a scan window 114 to a scan zone 116 outside the scanner 100, striking an object 117 introduced into the scan zone 116. As the laser beams 106 and 108 travel from the pattern mirror 112 to the scan zone 116, they may suitably be referred to as scan beams 118 and 120.

Figure 1B:
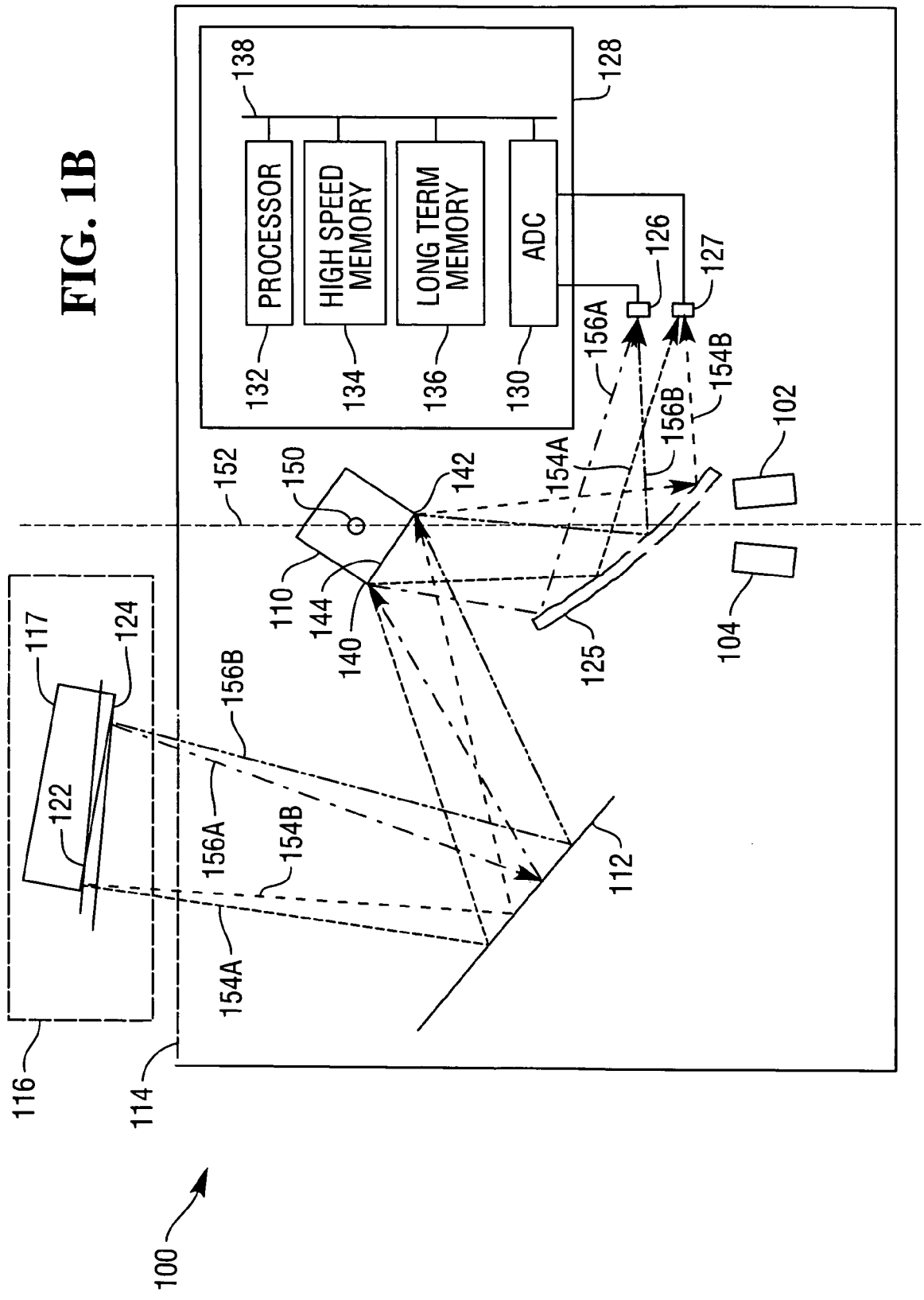
FIG. 1B illustrates the scanner of FIG. 1A, showing reflected light rays traveling from the scan zone into the scanner and being directed to a collector and imaged onto dual detectors.

As the spinner 110 rotates across a facet, the scan beams 118 and 120 move so as to trace out scan lines 122 and 124, as well as additional scan lines produced as the spinner rotates so that first one facet and then another is in the path of the laser beams 106 and 108. When the scan beams 118 and 120 strike the object 117 in the scan zone 116, that is, when the scan lines 122 and 124 intersect the object 117, light rays are scattered from the object, and groups of light rays are reflected back into the scanner 100. Selected light rays representing boundaries of the groups of scattered light rays, and their paths into and within the scanner, are illustrated in FIG. 1B and discussed below. The laser beams 106 and 108, scan beams 118 and 120 of FIG. 1A, and the reflected light rays illustrated in FIG. 1B, are present essentially simultaneously, but are shown in separate figures in order to provide for greater clarity of illustration, and to prevent the various elements from obscuring one another.

Light rays entering the scanner 100 are directed from one or more pattern mirrors, such as from the pattern mirror 112, to the spinner 110, and from the spinner 110 to a collector 125. The exemplary collector 125 illustrated here is a reflective ellipse with holes admitting the laser beams 106 and 108, but it will be recognized that other suitable choices for collection optics are possible, such as a conventional Fresnel collection lens, along with mirrors to admit the laser beams.

The collector 125 images the reflected light rays onto first and second dual detectors 126 and 127. The detectors 126 and 127 produce scan signals which are supplied to a detection and decoding unit 128 for processing. The detection and decoding unit may suitably include an analog to digital converter (ADC) 130, a processor 132, high speed memory 134, long term memory 136, and a communication bus 138.

FIG. 1A also shows first and second edges 140 and 142 of a facet 144 of the spinner 110, and projections 146 and 148 of the laser beams 106 and 108. Also shown in FIG. 1A are a central axis 150 of the spinner 110, and a vertical plane 152 passing through this central axis.

FIG. 1B illustrates the paths of reflected rays resulting from reflections of the scan beams 118 and 120 as the scan beams 118 and 120 are reflected from the object 117, which is present in the scan zone 116 in the position shown at the instant when the scan beams 118 and 120 are in their illustrated positions. The intersection of each of the scan beams 118 and 120 with the object 117 essentially results in the scattering of an approximately hemispherical cloud of light rays. A portion of these light rays pass through the scan window 114 into the scanner 100 in such a way as to be directed by the optical elements of the scanner 100 to the detectors 126 and 127.

The rays representing reflections of the scan beam 118 from the object 117 are bounded by the rays 154A and 154B. These rays are directed to the pattern mirror 112 and to the spinner 110, where the spinner 110 essentially captures the rays striking the facet 144 between the edge 140 and the edge 142. The spinner 110 directs these rays to the collector 125, which focuses them and images them onto the detector 126.

The group of light rays representing reflections of the scan beam 120 is bounded by the light rays 156A and 156B. These light rays are reflected from the pattern mirror 112 and directed by the pattern mirror 112 to the spinner 110. The rays striking the facet 144 between the edges 140 and 142 are directed to the collector 125, which focuses the rays onto the detector 127. The rays are focused onto the detectors in such a way that rays representing reflections of the scan beam 118 are focused onto the detector 126 and rays representing reflections of the scan beam 120 are focused onto the detector 127. By the time they reach the scan zone 116 and are reflected from the object 117, the scan beams 118 are sufficiently separated that rays representing reflections of the scan beam 118 will fall on the detector 126, and rays representing reflections of the scan beam 120 will fall on the detector 127. In typical scanners such as the scanner 100, groups of reflected rays representing a reflection of a scan beam are demagnified as they travel along optical paths within a scanner and are focused onto a detector. That is, the various optical elements within the scanner tend to cause the light rays to converge. The separation of the scan beams 118 and 120 in the scan zone 116 is sufficient to overcome this demagnification and to allow reliable focusing of the groups of light rays onto their respective detectors.

In order to achieve this objective, and to accomplish other desired results, scanners similar to the scanner 100 employ predetermined configurations of laser sources. Elements of the configurations include placement and orientation of the laser sources, as well as other specified characteristics, such as focusing distance, of the laser sources.

Returning now to FIG. 1A, it can be seen that the laser sources 102 and 104 are horizontally offset with respect to the spinner 110. This offset may suitably be described with reference to the plane 152 passing through the axis 150 of the spinner 110. In addition, the orientations of the laser sources 102 and 104 are offset from the plane 152. The laser source 102 is oriented toward the left of the plane 152, that is, leftward with respect to the spinner 110. The laser source 104 is oriented toward the right of the plane 152, that is, rightward with respect to the spinner 110. The laser sources 102 and 104 may also be offset in a vertical direction. Such vertical offset is not visible in the view of FIG. 1A, but may suitably be similar to that seen in the exemplary assembly illustrated in FIGS. 5A and 5B, and further discussed below.

Vertical placement and orientation and horizontal placement and orientation are typically independent of one another. Moreover, horizontal offsets and orientations have particular significance. The reason for this significance is that the spinner 110 rotates in what is essentially a horizontal direction with respect to the laser sources 102 and 104, so that horizontal placement and orientation of the laser sources 102 and 104 can have significant effects on the origin and direction of the laser beams 106 and 108 as they are reflected from the spinner 110. These effects on the origin and direction of the reflected laser beams have corresponding effects on the paths followed by the scan beams 118 and 120, and on the scan lines 122 and 124 traced out by the scan beams 118 and 120.

In order to achieve a small size for the scanner 100 and to increase the space available for components within the scanner 100 and to allow for the generation of scan patterns of limited sizes, the scanner 100 is desirably designed in such a way as to allow for desired separation of the scan beams 118 and 120 while limiting physical separation of the laser sources 102 and 104 within the scanner 100. One exemplary choice of placement and orientation, and the paths of the laser beams 106 and 108 resulting from such a placement and orientation, can be seen in an examination of FIG. 1A.

Because the laser sources 102 and 104 are offset from the center of the spinner 110, and because they are oriented leftward and rightward, respectively, with respect to the spinner, the optical paths of the laser beams 106 and 108 diverge as the laser beams 106 and 108 travel along their optical paths and into the scan zone 116. The projections 146 and 148, respectively, of the laser beams 106 and 108, can be seen to diverge, and the scan beams 106 and 108 themselves similarly diverge as they travel from the spinner 110, to the pattern mirror 112, and into the scan zone 116, so that the scan beams 118 and 120 exhibit a significant separation from one another by the time they reach the scan zone 116. As the scan beams 118 and 120 are reflected from the object 117 and the light rays generated by this reflection travel back into and through the scanner to the detectors 126 and 127, the separation of the light rays is diminished because the optical elements directing the light rays within the scanner 100 tend to induce convergence of the light rays. The separation of the scan beams 118 and 120 achieved by the selection of offset and orientation of the laser sources 102 and 104 overcomes this convergence and insures that the reflected light rays representing reflections of each scan beam will be focused onto their appropriate collector.

In addition to achieving divergence of the laser beams 106 and 108 through placement and orientation of the laser sources 102 and 104 so as to be offset with respect to the spinner 110, a number of desirable results can be achieved through specific selection of the placement and orientation of the laser sources 102 and 104 with respect to the spinner 110.

The scan lines 122 and 124 can be seen to be essentially aligned horizontally, but exhibiting a relatively slight vertical separation. The vertical separation suitably results from a vertical offset and orientation of the laser sources 102 and 104, similar to that shown for the assembly illustrated in FIGS. 4A and 4B. This vertical separation may be achieved independently from any horizontal alignment or offset that may be achieved. In addition, it is possible, and may be advantageous in many cases, for pairs of scan lines such as the scan lines 122 and 124 to be produced without any vertical offset.

The spinner 110 is described here are rotating clockwise by way of example, but it will be recognized that the present invention may be implemented with spinners rotating clockwise or counterclockwise, and results analogous to those described here may be achieved with a counterclockwise rotation of the spinner 110 or a similar spinner.

As the spinner 110 rotates clockwise, that is, from right to left, the scan beams 118 and 120 travel from right to left, tracing out the scan lines 122 and 124, respectively. In the exemplary embodiment shown here, the scan beam 118 precedes the scan beam 120 in its travel, so that at the instant illustrated here, the scan beam 118 is significantly further along its direction of travel than is the scan beam 120. Essentially, the scan beams 118 and 120 sweep through the same horizontal space, closely separated in time. This result is achieved by directing the laser sources 102 and 104 so that the laser beam 106 intersects the spinner 110 at a point ahead of the point at which the laser beam 108 intersects the spinner. In FIG. 1A, the laser beam 106 is directed to the point 160 and the laser beam 108 is directed to the point 162. As the spinner rotates clockwise, that is, from right to left, for example from the edge 140 to the edge 142, each point on the facet 144 will arrive first at the point 160 at which the laser beam 106 intersects the spinner 110, then at the point 162 at which the laser beam 108 intersects the spinner 110. The movement of the spinner 110 will have similar effects on the movement of the reflections of the laser beams 106 and 108, and therefore on the movements of the scam beams 118 and 120, but these effects will be manifested first on the scan beam 118 and then on the scan beam 120. A clockwise rotation of the spinner 110 will have the effect of moving the scan beams 118 and 120 from right to left to trace out the scan lines 122 and 124, respectively, and the scan beam 118 will precede the scan beam 120 in this motion except during the period when the reflection of the laser beam 106 has moved off of the mirror 112, but the reflection of the laser beam 108 is still traveling along the mirror 112.

The scan lines 122 and 124 can be seen to be horizontally aligned. This horizontal alignment, combined with the fact that the scan beam 118 precedes the scan beam 120, gives the effect of two scan beams traveling through the same horizontal space in the scan zone 116, with one of the scan beams preceding the other through the space. Essentially, the scan beams 118 and 120 can be thought to be temporally separated. Because of this temporal separation, the scan beams 122 and 124 will not overlie one another whether or not they are vertically separated, because the scan beam 122 will be traced out in advance of the scan beam 124. Therefore, if desired, the laser sources 102 and 104 can be oriented so that the scan beams are aligned vertically, for example, by giving the laser sources 102 a similar vertical placement and orientation with respect to the spinner 110.

In order to achieve the horizontal alignment shown, the laser sources 102 and 104 are oriented so as to achieve a similar symmetry of the reflected scan beams 106 and 108 with respect to the spinner 110. The spinner 110 is a four sided spinner, and in fact is a square spinner. Therefore, the reflections of each of the laser beams 106 and 108 are initially reflected 90 degrees to the right with respect to the plane 152. These reflections swing through a clockwise arc of 180 degrees, to finish reflected 90 degrees to the left with respect to the plane 152. The initial 90 degrees rightward orientation of the reflected laser beam occurs when a vertex of the spinner 110, such as the vertex 140, is positioned such that a line between the axis 150 and the vertex 140 form an angle with the plane 152 which is one-half the angle formed between a laser beam incident on the vertex 140 and the plane 152.

A similar symmetry can be achieved using other spinners that are regular polygons, but spinners having fewer or more than four facets will achieve different initial and terminal orientations for reflected laser beams than the initial and terminal orientations shown here. For example, a configuration similar to that illustrated here but using a six sided spinner will achieve initial and terminal orientations of 60 degrees on either side of a central plane.

For a square spinner, such as the spinner 110, the reflected laser beam swings through an arc of 180 degrees as the spinner rotates through 90 degrees. In order to achieve this result, the point 160 is chosen so that a line between the point 160 and the central axis 150 forms an angle with the plane 152 that is one half the angle between the laser beam 106 and the plane 152. The point 162 is chosen so that a line between the point 162 and the central axis 150 forms an angle with the plane 152 that is one half the angle between the laser beam 108 and the plane 152. Such an arrangement is explained in greater detail below in connection with FIG. 2, which illustrates a spinner 200 with a vertex positioned at a point so as to produce an initial reflection of an incident laser beam, with the initial reflection from a facet of interest oriented 90 degrees right of a centerline of the spinner.

The initial and terminal angles of 90 degrees illustrated here are achieved using square spinners, but as is explained in greater detail below, the relationship between angles described above will achieve an equal symmetry between initial and terminal angles for any spinner configured as a regular polygon.

As noted above, the scan lines 122 and 124 are horizontally aligned, which means that the scan beams 118 and 120 are sweeping through the same horizontal space. In addition, also as noted above, the scan beam 118 leads the scan beam 120. At the instant depicted in FIG. 1A, for example, the scan beam 118 can be seen to be at a point 170 along the scan line 122, and the scan beam 120 can be seen to be at a point 172 along the scan line 124. Both scan beams 118 and 120 are traveling from right to left, and the scan beam 118 arrives at a lateral point along the scan line 122 before the scan beam 120 arrives at an equivalent lateral point along the scan line 124. For example, suppose that the object 117 bears a bar code on a portion of the object 117 that is within the area 174. The scan beam 118 will sweep through the area 174, and then the scan beam 120 will sweep through the area 174. The scan beams 118 and 120 will successively trace over the bar code, and the characteristics of scan signals generated by the detectors 126 and 127 will successively exhibit characteristics indicative that such a tracing has occurred. Because reflected light rays representing reflections of the scan beams 118 and 120 are separately imaged onto the detectors 126 and 127, respectively, the scan signals generated by the detectors 126 and 127, respectively, will have been generated by reflected light rays resulting from the first, and then the second, tracing across the bar code. The scan signals can be interpreted in a number of different ways, for example, combining information from both scan signals so as to take advantage of information that is present in one or the other but may not be present in both. As another alternative, information from the first scan signal resulting from the first tracing may be used to enhance the interpretation of the second scan signal, for example, setting electrical thresholds or other parameters. These techniques could also be combined or selectively used, or if both scan signals provided essentially the same information, either one, or the one providing the most reliable information could be used.

Alternatively or in addition, the laser sources 102 and 104 may be dissimilarly focused. Reading of severely demagnified tags is more easily accomplished using a small laser spot size, but the use of a small laser spot size limits the read range provided by the laser beam producing this small laser spot size. The use of two laser sources, such as the laser sources 102 and 104, allows for dissimilar focusing of the laser sources so that they provide an extended read range between them. For example, in the embodiment illustrated in FIG. 1A, the laser source 102 might be focused so as to provide a read range from two inches to six inches past the scan window 114, and the laser source 104 might be focused so as to provide a read range from six inches to ten inches past the scan window 114. If a bar code is positioned in the area 174, for example, the scan beam 118 would sweep along the bar code, followed by the scan beam 120. The scan beam 118 would produce a usable signal if the bar code were positioned from 2 to 6 inches from the scan window 114, and the scan beam 120 would produce a usable signal if the bar code were positioned from 6 to 10 inches from the scan window 114. The signal providing usable results could be selected and decoded.

As noted above, the scan beams 122 and 124 can be said to be temporally separated, because they are not traced out at the same time. Because of this temporal separation, the scan beams 122 and 124 will not overlie one another whether or not they are vertically separated, because the scan beam 122 will be traced out in advance of the scan beam 124. Therefore, if desired, the laser sources 102 and 104 can be oriented so that the scan beams are aligned vertically, for example, by giving the laser sources 102 a similar vertical placement and orientation with respect to the spinner 110. In such a case, the scan beams 122 will sweep out through the same, or nearly the same, horizontal and vertical space, but at shortly separated times.

For simplicity of illustration, FIGS. 1A and 1B illustrate first and second laser sources 102 and 104 and first and second detectors 126 and 127, but a scanner similar to the scanner 100 may be constructed so as to employ multiple sets of laser sources and detectors, with reflected rays representing reflections of laser beams produced by each laser source being directed to a detector associated with that laser source. To take one example, a scanner similar to the scanner 100 might be designed with an additional laser source disposed horizontally between the laser sources 102 and 104 and an additional detector disposed horizontally between the detectors 126 and 127.

Figure 1C:
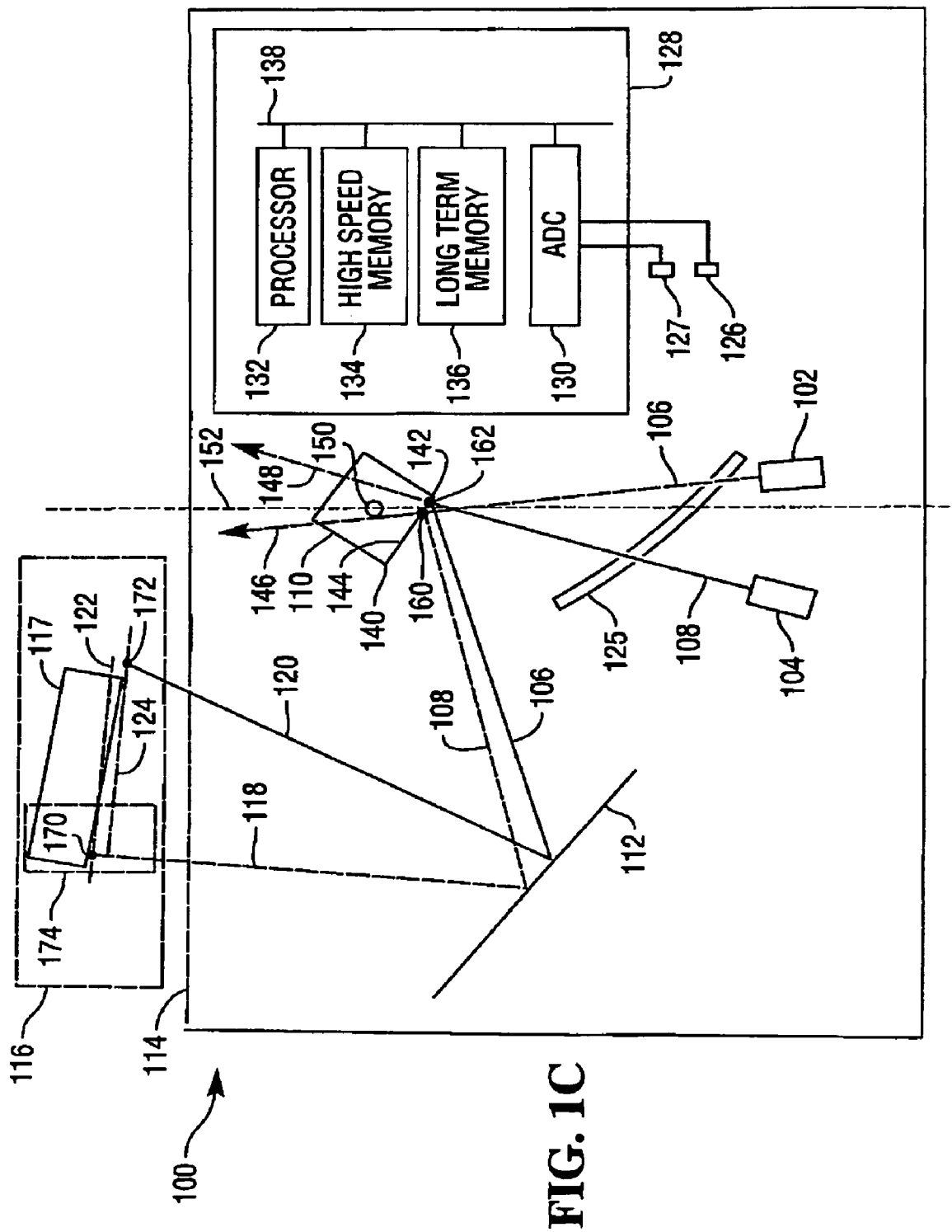
FIG. 1C illustrates an alternative scanner configuration, showing laser beams originating from laser sources directed in such a way that the reflected laser beams will exhibit differing symmetries.

FIG. 1C illustrates an alternative configuration of the scanner 100. In this alternative configuration, the laser source 104 is placed and oriented differently than the corresponding laser source 104 of FIGS. 1A and 1B, such that the laser beam 106 is at a different angle with respect to the plan 152 than is the laser beam 108. The reflected laser beam 106 is thus at a different angle than is the reflected laser beam 108, and the scan beam 120 forms a different angle with the mirror 112 than does the scan beam 118. The scan beam 120 traces out a scan line 124 that is horizontally shifted with respect to the scan line 122 traced out by the scan beam 118.

Figure 2:
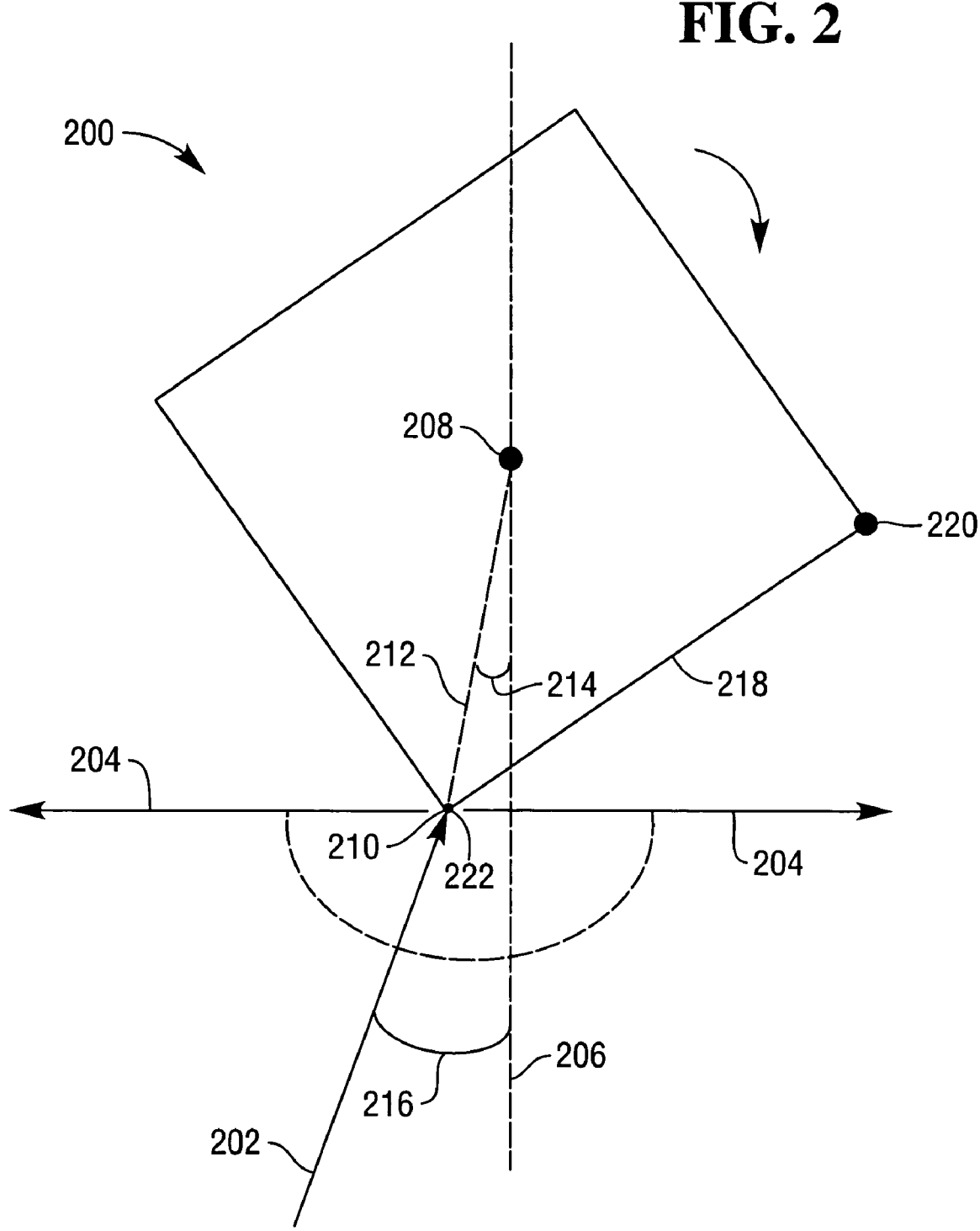
FIG. 2 illustrates a spinner which may be suitably employed in a scanner according to an aspect of the present invention, showing orientation of a laser beam striking the spinner and achieving a desired symmetry for a laser beam reflected from the spinner.

FIG. 2 illustrates an exemplary spinner 200, similar to the spinner 110 of FIG. 1, and showing an incident laser beam 202 directed to the spinner 200. The angle of incidence of the laser beam 202 to the spinner 200 follows the principles discussed above in connection with the spinner 110. That is, a reflected laser beam 204 is initially reflected from the horizontal orientation of the laser beam 202 with respect to the spinner 200 at an angle of 90 degrees to the right from a centerline 206 of the spinner. The centerline 206 is a line passing through the vertical axis 208 of the spinner 200.

The initial orientation of the reflected laser beam 204 is obtained when a vertex 210 of the spinner 200 is at a specified angular displacement from the centerline 206 with respect to the laser beam 202. This displacement occurs when the vertex 210 is displaced from the centerline by one-half the angle formed by the laser beam with the centerline. In the present exemplary case, a line 212 may be projected between the vertex 210 and the central axis 208 of the spinner. This line 212 forms an angle 214 with the centerline 206, and this angle 214 represents the displacement of the vertex 210 from the centerline 206. At the instant illustrated by FIG. 2, the displacement of the vertex 210 is one half the angle 216 between the laser beam 202 and the centerline 206. In the present exemplary case, the displacement of the vertex 210 from the centerline 206, is ten degrees and the angle between the laser beam 202 and the centerline 206 is 20 degrees. Therefore, the reflected laser beam 204 is at an angle of 90 degrees to the right of the centerline 206.

As the spinner 200 rotates clockwise through an angle of 90 degrees, so that the facet 218 passes before the laser beam 202, the reflected laser beam 204 swings through an arc of 180 degrees until it is at an angle of 90 degrees to the left of the centerline as the vertex 220 passes before the laser beam 202. This movement of the reflected laser beam 204 through an arc of 180 degrees as one facet passes before a laser beam from one vertex to the next is typical for four square spinners. Therefore, the symmetry described above will be maintained by a laser beam reflected from a spinner if the angle between the point at which the incident laser beam strikes the spinner is angularly displaced from the centerline of the spinner by an angle one-half that formed by the incident laser beam itself with the centerline. In FIG. 2, this point is the point 222, which is the point at which the vertex 210 has arrived at the instant shown. The point 222 is displaced from the centerline 206 by the angle 214, that is, ten degrees, and this angle is preserved as the spinner 200 rotates.

Multiple laser sources directed at a spinner such as the spinner 110 of FIGS. 1A and 1B, and the spinner 200 of FIG. 2, can preserve a similar symmetry to that described above if they are directed at the spinner so as to meet the conditions described above. That is, each laser source is oriented and directed so that the point at which the laser beam produced by the laser source is incident upon the spinner is displaced from the centerline of the spinner by one-half the angle between the laser beam and the centerline. Both the laser beam 106 and the laser beam 108 of FIG. 1A meet this condition.

Preserving a similar symmetry, suitably the symmetry described above where each of two laser beams incident to a spinner produces a reflection swinging through an arc from 90 degrees to one side of the spinner centerline, to 90 degrees to the other side for a square spinner, or more generally, from an angle on one side to an equal angle on the other side, is not necessary for every application. Numerous useful objectives can be achieved by modifying the symmetry at which the different laser beams are reflected from the spinner. This modification can be accomplished by proper selection of the placement and orientation of the laser sources.

Returning now to FIG. 1A, the laser sources 102 and 104 are placed and oriented so that each of the laser beams produces an initial reflection 90 degrees to the right, swinging through 180 degrees and achieving a direction 90 degrees to the left. For a square spinner, such as the spinner 110, the reflected laser beams will swing through a 180 degree arc. However, depending on the particular application in which a scanner similar to the scanner 100 is to be used, the initial and final directions of the reflected laser beams need not be at equal angles from a centerline. Instead, through proper choice of the placement and orientation of laser sources similar to the laser sources 102 and 104, the initial and terminating angles of a reflected laser beam can be chosen. In addition, different choices can be made for the different laser sources, producing different symmetries for the reflected laser beam produced by each laser source.

For example, again assuming a square spinner, a laser source analogous to the laser source 102 might be placed and oriented so as to produce a reflected beam initially directed 80 degrees to the right, rather than 90 degrees. The reflected beam would then terminate at an angle 100 degrees to the left. A laser source analogous to the laser source 104, on the other hand, might be placed and oriented so as to produce a reflected beam initially directed 100 degrees to the right, rather than 90 degrees. The reflected beam would then swing through an arc of 180 degrees and terminate at an angle 80 degrees to the left. The effect of such a change on the scan lines produced by such a configuration would be that the scan lines would be displaced leftward and rightward of one another. The effect of such displacement is that the scan pattern defined by the scan lines would have a greater extent to the left and right, but would have a greater density in a central area, where the lines would produce an overlap.

Figure 3:
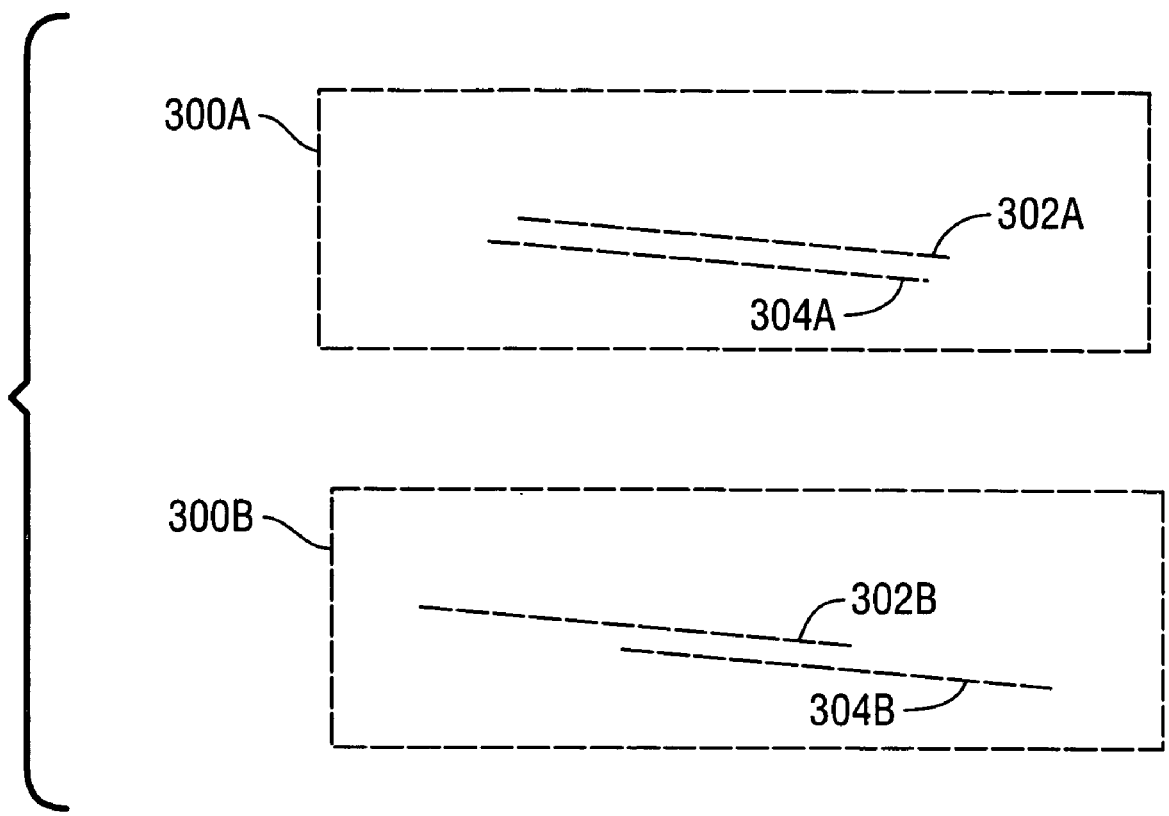
FIG. 3 illustrates pairs of scan lines that may be produced by a scanner according to an aspect of the present invention.

Such an offset can be seen in FIG. 3, which includes two views of exemplary scan zones 300A and 300B. The scan zone 300A includes scan lines 302A and 304A, which are similar to the scan lines 122 and 124 of FIGS. 1A and 1B. The scan zone 300B includes scan lines 302B and 304B, which are similar to the scan lines 302A and 304A, but which exhibit a horizontal displacement resulting from orientation of dual laser sources so as to produce an asymmetry in the reflection of the laser beam producing the scan line 302B from that of the laser beam producing the scan line 304B. Because the scan lines 302B and 304B do not trace through the same horizontal space, the contributions of both are used to provide complete coverage for the horizontal space. The displacement of each of the scan lines 302B and 304B can be said to create a gap in the coverage provided by each, with this gap being filled by the other. Because the scan pattern produced by horizontally displaced scan beams uses the contribution of both laser sources of a pair, the laser sources are preferably similarly focused when such displacement is employed.

Figure 4:
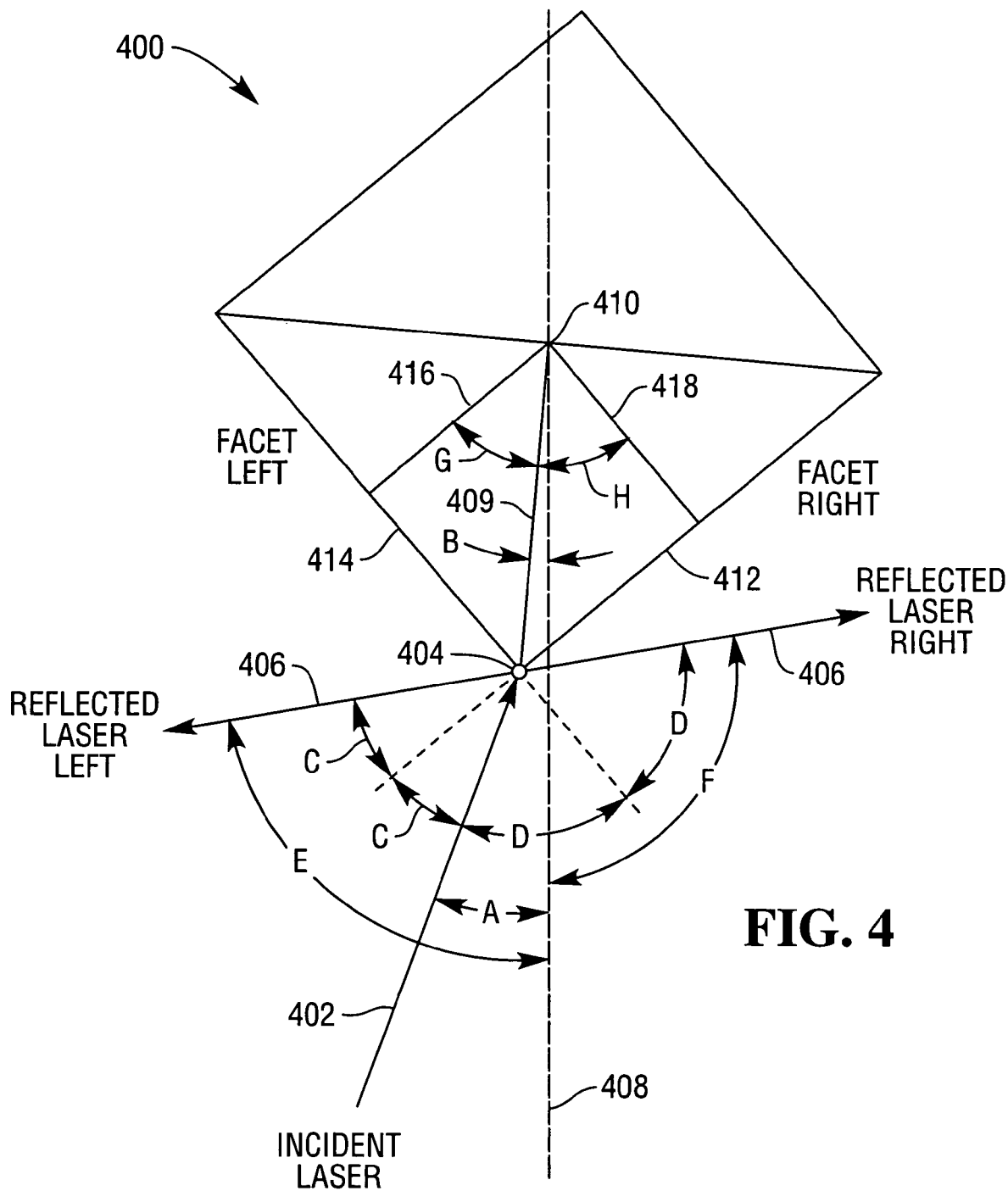
FIG. 4 illustrates a spinner which may be suitably employed in a scanner according to an aspect of the present invention, showing various relationships employed in a generalized selection of a desired symmetry.

As noted above, horizontal displacement of scan lines produced by dual laser sources can be achieved by offsetting the symmetries at which the laser beam produced by each of the laser sources is reflected from a spinner. FIG. 4 illustrates a spinner 400 and a laser beam 402 incident to the spinner 400. By proper orientation of the incident laser beam 402 with respect to the spinner 400, any number of desired symmetries may be achieved.

The laser beam 402 strikes the spinner 400 at the point 404, causing the generation of a reflected laser beam 406, which has initial and terminal angles with respect to a centerline 408 of the spinner 400. Various angular relationships between the laser beam 402, the centerline 408, and elements of the spinner 400 relate to computation of the initial and terminal angles of the reflected laser beam 406. These angles are shown as angles A through H in FIG. 4 and are defined below as follows:

A is the angle between the incident laser beam 402 and the centerline 408.

B is the angle between the centerline 408 and a line 409 from the central axis 410 of the spinner 400 and the point 404 at which the laser beam 402 strikes the spinner 400.

C is the angle between the final angle of the reflected laser beam and the surface normal direction of the facet 414 rotating away from the laser beam 402. The angle C is twice the angle between the incident laser beam 404 and the final direction of the reflected beam 406.

D is the angle between the initial direction to the right, of the reflected laser beam 406 and the surface normal direction of a facet 412 rotating to intercept the laser beam 402. The initial angle of the reflected laser beam is achieved when the laser beam is incident to a vertex, as noted above with respect to the case illustrated in FIG. 2. The angle D is half the angle between the incident laser beam 402 and the initial direction to the right, of the reflected beam 406.

E is the angle between the terminal direction of the reflected laser beam 406 and the centerline 408.

F is the angle between the initial direction of the reflected laser beam 406 and the centerline 408.

G is the angle between the line 409 and a line 416 bisecting the facet 412.

H is the angle between the line 409 and a line 418 bisecting the facet 412.

A particular symmetry for the reflected scan beam 406 is suitably defined by the initial and terminal angles F and E, which are the angles of the initial and terminal directions of the scan beam 406 with respect to the centerline 408. The angles E and F can be defined by the following relationships:

$$C = G - A + B \tag{1}$$

$$E = 2C + A, \text{ which can be rewritten as} \quad (2)$$

$$E = 2G - (A - 2B) \quad (3)$$

$$D = H + A - B \quad (4)$$

$$F = 2D - A, \text{ which can be rewritten as} \quad (5)$$

$$F = 2H + (A - 2B). \quad (6)$$

The values of G and H will be defined by the design of the spinner 400. Given these values, the values of A and B can be chosen to yield desired values for E and F.

For a regular n-sided polygon, the values of G and H are given as follows:

$$G = H = 360°/2n. \quad (7)$$

For example, for a square spinner, such as the spinner 400, $G = H = 360°/(2*4) = 45°$.

The values of E and F can then be expressed as follows:

$$E = 90° - (A - 2B) \quad (8)$$

$$F = 90° + (A - 2B) \quad (9)$$

If $A = 2B$, $E = F = 90°$.

This is the case described above with respect to FIGS. 1A, 1B, and 2.

In practical application, a scan pattern will consist of numerous scan lines. With a four sided spinner, such as the spinner 110, a scanner will typically generate a set of four scan lines for each laser source, as the spinner rotates to bring each of four facets into the path of the laser sources. In addition, a set of four scan lines per laser is contributed by each pattern mirror, as the spinner directs reflected laser beams from one pattern mirror to another. With appropriate placement and orientation of the laser sources, each scan line contributed by one laser source or the other may exhibit a displacement due to the symmetry of the reflection of the laser beam produced by the laser. Depending on the choices made for placement and design of pattern mirrors and the geometry of the scanner, numerous alternatives are possible, taking advantage of the displacements of the scan lines. For example, sets of scan lines may be oppositely displaced left to right, producing a scan pattern having a greater extent left to right and a greater density where more scan lines overlap, such as in the center.

In addition to employing horizontal offset and orientation to produce desired features of scan patterns, laser sources such as the laser sources 102 and 104 may be vertically offset. Such a vertical offset can be used to generate the offset seen between the scan lines 122 and 124 of FIG. 1, and appropriate selection of vertical offset can be used to control spacing between scan lines contributed by each of a pair of dual laser sources. As noted above, a typical spinner has a number of facets. Each facet may contribute one scan line to a scan pattern when the facet rotates in the path of a laser beam produced by a laser source and the laser beam is directed along an optical path by a sequence of pattern mirrors. The use of two laser sources provides an opportunity to substantially increase the number of scan lines in a scan pattern, doubling the number of scan lines if desired. Vertical offsets can be used to vertically separate scan lines, and can be used to increase the density of a scan pattern, for example, producing two vertically offset and parallel scan lines when a facet directs reflected laser beams from each laser source across a pattern mirror. Vertical offsets can be selected independently of horizontal offsets, and can be based on the geometry of the optical paths of the reflected scan beams, and the specific pattern that is desired. For example, if a scanner is configured to produce a scan pattern with a 6 millimeter separation between scan lines contributed by one laser source, the two laser sources can be configured to produce a vertical offset so that lines contributed by each laser source fall midway between lines contributed by the other, thereby producing a scan pattern with a 3 millimeter separation between scan lines. Such increased density is highly useful for reading truncated bar codes, that is, bar codes that have a reduced height for their length.

Figure 5A:
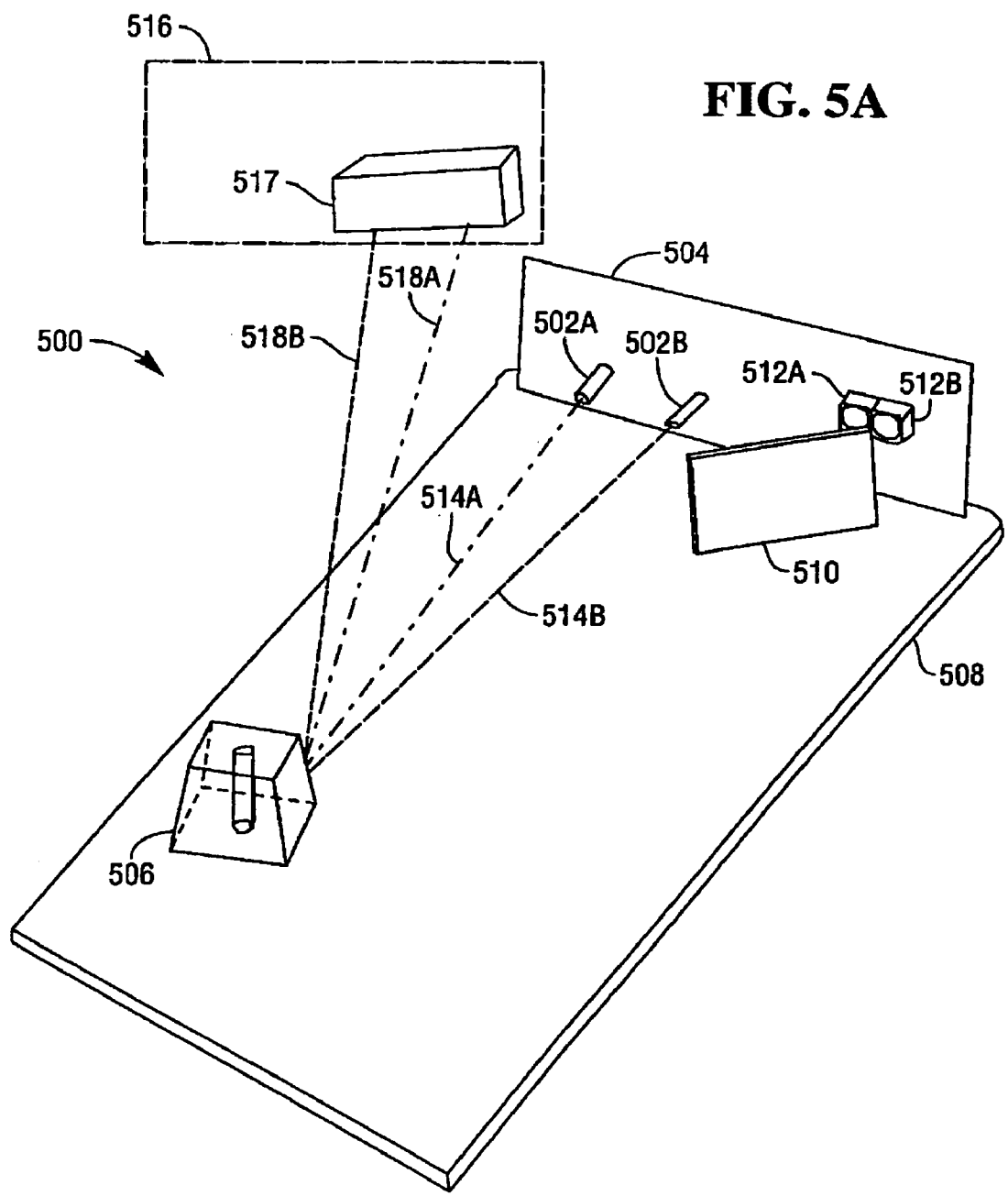
FIGS. 5A-5D illustrate various views of an optical assembly according to an aspect of the present invention.

FIG. 5A is an isometric view of a scanner assembly 500 according to an aspect of the present invention, showing laser sources having horizontal and vertical offsets and orientations so as to produce a desired horizontal and vertical separation of scan beams generated by the assembly. The assembly 500 includes laser sources 502A and 502B, suitably mounted on an electronics assembly such as a printed circuit board 504. The printed circuit board 504 and a spinner 506 are mounted on a base 508. A collection mirror 510 is mounted on the base 508 and the printed circuit board 504 includes first and second dual detectors 512A and 512B. The assembly 500 also includes a collector, which can be seen in FIG. 5B, but which is omitted here in order to allow the laser sources 502A and 502B to be seen. The laser sources 502A and 502B emit laser beams 514A and 514B, respectively.

The laser sources 502A and 502B are horizontally offset from the center of the spinner 506, and are oppositely oriented with respect to the spinner 506. If the viewpoint chosen is a viewpoint facing in the direction of travel of the laser beams 514A and 514B, the laser source 502A is offset toward the right of the spinner 506 and the laser source 502B is offset toward the left of the spinner 506. In addition, the laser source 502A is oriented leftward with respect to the spinner 506, and the laser source 502B is oriented rightward.

The laser sources 502A and 502B are also offset and differently oriented vertically. The laser source 502A is placed higher than is the laser source 502B, and is oriented in a downward direction, so that it is directed, and the laser beam 514A travels, downward and to the left. The laser source 502B is placed lower than is the laser source 502B, and is oriented in an upward direction, so that it is directed, and the laser beam 514B travels, upward and to the right. The laser beams 514A and 514B are reflected from the spinner 506, and are directed to a scan zone 516, where they strike an object 517. As they travel from the spinner 506 to the scan zone 516, the laser beams 514A and 514B may suitably be referred to as scan beams 518A and 518B. The offsets and orientations of the laser sources 502A and 502B result in horizontal and vertical separation of the scan beams 518A and 518B, so that from a viewpoint oriented in the initial direction of travel of the laser beams 514A and 514B, the scan beam 518A is leftward of the scan beam 518B, and vertically offset so as to be below the scan beam 518B. By the time the scan beams 518A and 518B reach the scan zone 516, the effects produced by the orientations of the laser sources 502A and 502B have overcome the effects produced by their positioning. That is, the scan beam 518A is to the left of the scan beam 518B even though the laser source 502A is to the right of the laser source 502B, and the scan beam 518A is influenced by the downward direction of travel of the laser beam 514A, even though the laser source 502A is higher in elevation than is the laser source 502B.

The particular choices made for offsets and orientations of laser sources such as the laser sources 502A and 502B can be chosen so as to achieve the desired effects on the scan beams in a number of different ways. For example, in a typical scanner, a spinner such as the spinner 506 has different rise angles for each facet, so that the spinner tends to induce a vertical divergence based on the different rise angles. In addition, typical scanners may include sequences of optical elements such as primary and secondary pattern mirrors, with each pattern mirror advantageously being large enough intercept a laser beam reflected from each facet of the spinner. The vertical offsets and orientations of laser sources such as the laser sources 502A and 502B can be chosen so as to partially overcome divergence induced by a spinner, so that the laser beams tend to converge toward a particular optical element, or to diverge less than they would in the absence of an offset and orientation chosen to reduce divergence. Such a configuration can allow for the use of smaller optical elements than would otherwise be the case for a two laser system.

Figure 5B:
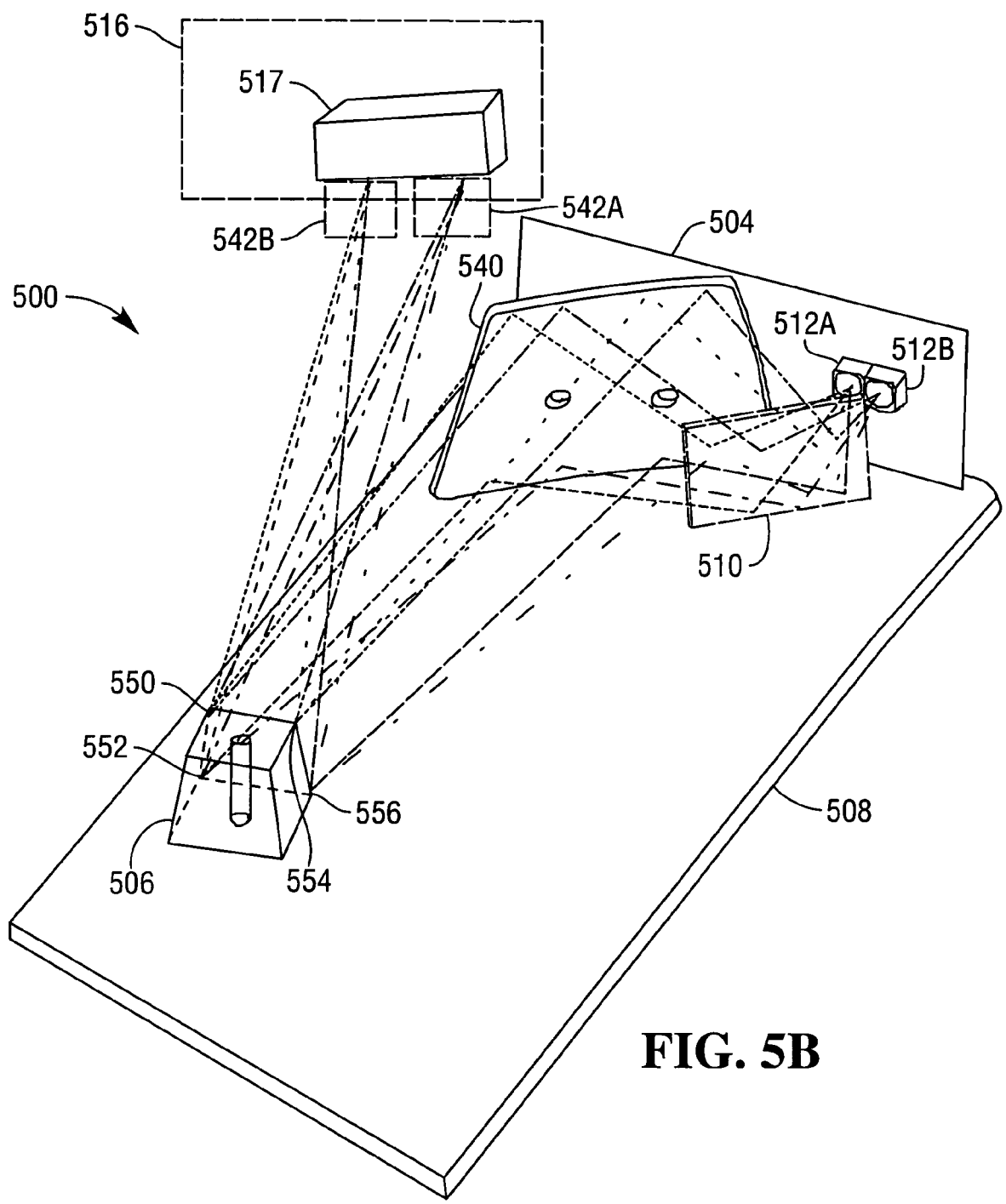

FIG. 5B illustrates an additional view of the assembly 500, showing a collector 540. The laser sources 502A and 502B are obscured by the collector, and the laser beams 514A and 514B are omitted here in order to avoid confusion with the reflected light rays depicted in FIG. 5B. Two groups of reflected light rays 542A and 542B can be seen to be scattered from the object 517 in the scan zone 516. The group 542A represents a reflection of the scan beam 518A and the group 542B represents a reflection of the scan beam 518B. The groups of light rays strike the spinner 506, and are reflected by the spinner 506 to the collector 540. The groups of light rays directed to the collector 540 are bounded by rays from each group that strike vertices 550 and 552 on the top and bottom, respectively, of the right of the spinner 506 from a viewpoint facing the direction of travel of the laser beams 514A and 514B, and by rays from each group that strike vertices 554 and 556 on the top and bottom of the right of the spinner. The rays striking the spinner 506 at the vertices 550 and 554 are directed toward the top of the collector 540, and are directed from there toward the top of the mirror 510, and to their respective detectors 510A and 510B, with rays representing reflections of the scan beam 518A being directed to the detector 510A, and with rays representing reflections of the scan beam 518B being directed to the detector 510B. Similarly, the rays striking the spinner 506 at the vertices 552 and 556 are directed toward the bottom of the collector 540, and are directed from there toward the bottom of the mirror 510, and to their respective detectors 5102A and 5102B. Rays striking the spinner 506 between the boundaries shown by the rays striking the spinner 506 at its top and bottom are directed along numerous optical paths between these boundaries.

Figure 5C:
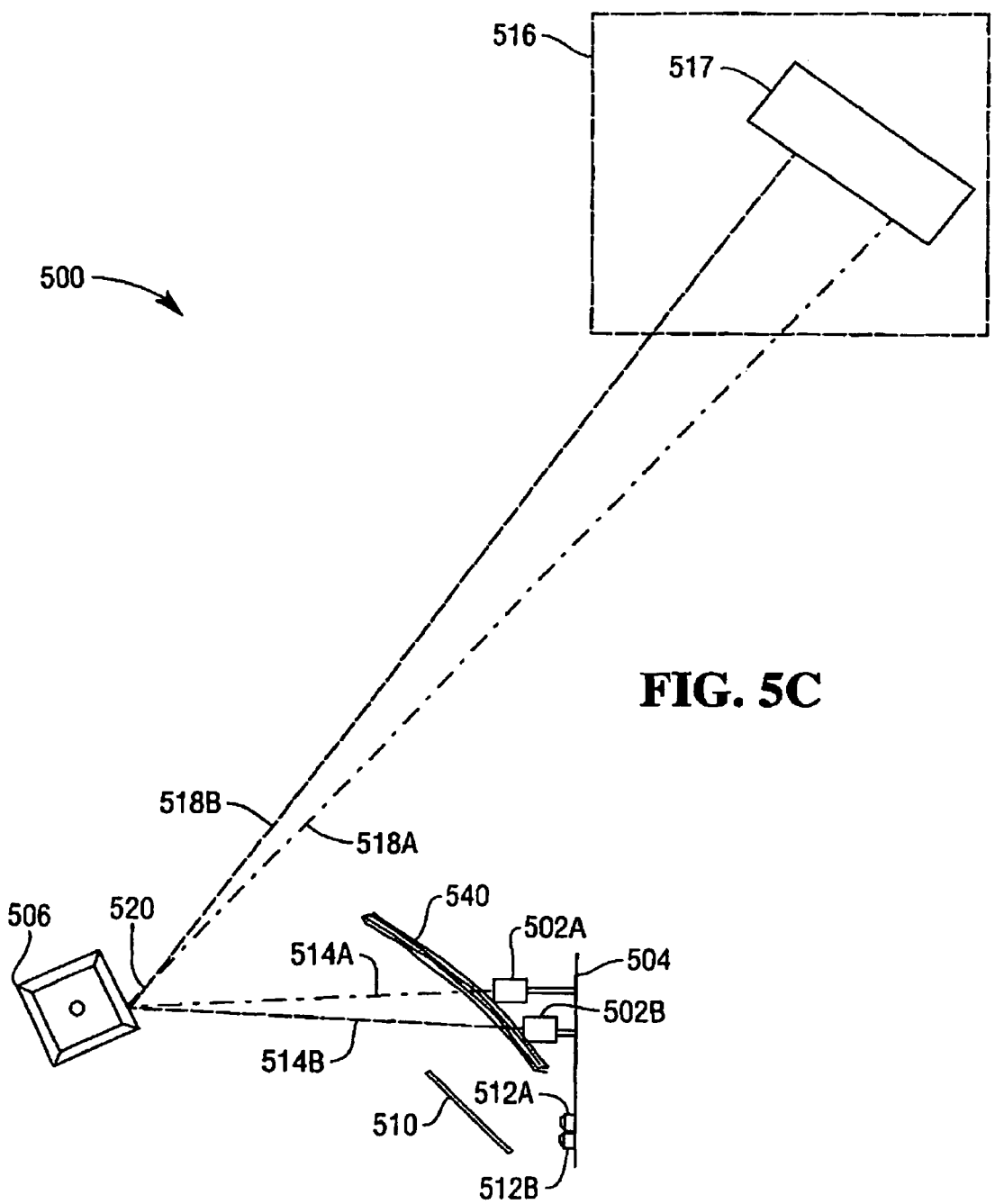

FIG. 5C illustrates a top down view of the assembly 500, showing the laser sources 502A and 502B, the printed circuit board 504, the spinner 506, the mirror 510, the detectors 512A and 512B, and the collector 540. The laser beams 514A and 514B can be seen traveling to the spinner 506, crossing at the point 520, and traveling to the scan zone 516 as scan beams 518A and 518B, where they strike the object 517. The differing horizontal offsets and orientations of the laser sources 502A and 502B can be seen, as can the effect of this offset and orientation on the horizontal components of the paths of the laser beams 514A and 514B and the scan beams 518A and 518B.

Figure 5D:
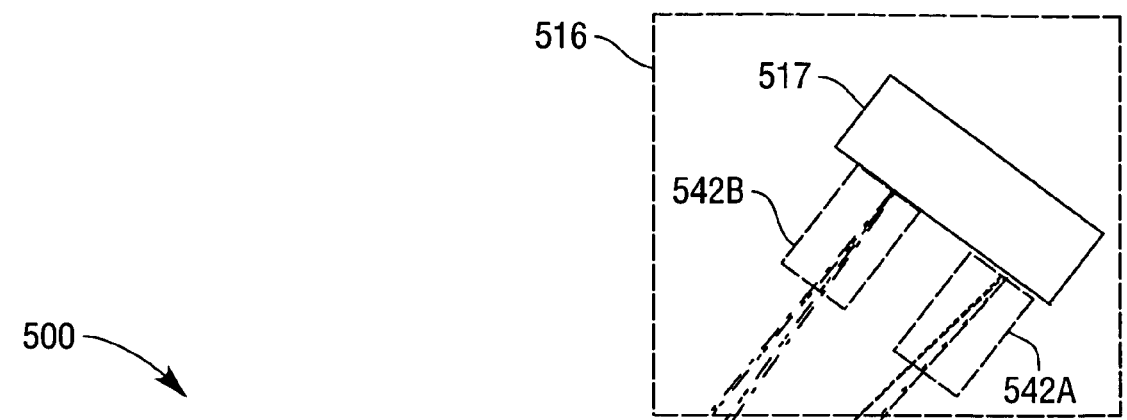
Figure 5D:
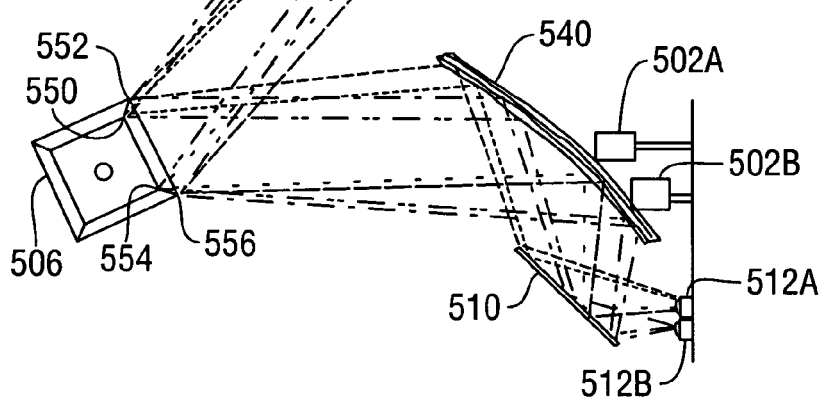

FIG. 5D illustrates an additional top down view of the assembly 500, showing the reflected rays returning to the assembly 500 and directed to the detectors 512A and 512B. FIG. 5D shows the laser sources 502A and 502B, the printed circuit board 504, the spinner 506, the mirror 510, the detectors 512A and 512B, and the collector 540. The laser beams and scan beams are omitted here in order to avoid obscuring the reflected rays. The differing horizontal offset and orientation of the laser sources 502A and 502B can be seen, as can the effect of this offset and orientation on the horizontal components of the paths of the laser beams 514A and 514B and the scan beams 518A and 518B. The two groups of light rays 542A and 542B can be seen, with the spinner capturing the light rays and directing them to the collector. Each group is bounded by rays striking the spinner 506 at the top and bottom vertices 550 and 552 on the right side of the spinner 506, and by rays striking the spinner 506 at the top and bottom vertices 554 and 556 on the left side of the spinner 506.

FIG. 6 illustrates a process 600 of scan pattern generation and bar code decoding according to an aspect of the present invention. The process 600 may suitably be performed using a multiple laser and multiple detector scanner such as the scanner 100 of FIGS. 1A and 1B, or using optical assemblies such as the assembly 500 of FIGS. 5A-5D. At step 602, multiple laser sources properly mounted and oriented with respect to a rotating spinner are utilized to generate laser beams that will be reflected from the spinner at desired directions and symmetries. The directions and symmetries are suitably chosen to produce desired characteristics for scan lines traced out by reflections of the laser beams, and may be chosen so that each rotation of a spinner facet in the paths of the laser sources produces one or more pluralities of scan lines having desired characteristics. For example, pluralities of scan lines may trace through the same horizontal space, may be horizontally offset from one another, and may be vertically offset from one another by desired amounts. In addition, scan beams produced as the reflected laser beams move into a scan zone will suitably exhibit a desired minimum separation at the scan zone. The mounting and orientation suitably includes one or more of horizontal and vertical offset of the multiple laser sources with respect to a spinner, and orientation of the multiple laser sources in opposite horizontal and vertical directions with respect to the spinner.

At step 604, laser beams are reflected from the spinner and directed along specified optical paths so as to produce multiple scan beams emerging from a scanner and tracing out scan lines within a scan zone.

At step 606, light rays representing reflections of the multiple scan beams scattered from an object within the scan zone and entering the scanner are directed to a collector. At step 608, light rays representing reflections the scan beams are directed from the collector to a plurality of detectors, with with light rays representing reflections of each scan beam being directed to a detector positioned to receive light rays representing reflections of that scan beam. At step 610, scan signals produced by the detectors in response to illumination by the light rays are processed in order to detect and decode bar codes reflecting the scan beams.

While the present invention is disclosed in the context of a presently preferred embodiment, it will be recognized that a wide variety of implementations may be employed by persons of ordinary skill in the art consistent with the above discussion and the claims which follow below.

I claim:

1. A bar code scanner, comprising:
multiple laser sources for generating multiple laser beams, the multiple laser sources being positioned and oriented such that the multiple laser beams generate reflected laser beams, originating as reflections of the multiple laser beams from the facets of a rotating spinner, each of the multiple laser beams being simultaneously reflected from the same facet of the rotating spinner as the facet passes in the path of the multiple laser beams, the reflected laser beams emerging from the scanner as scan beams and tracing out scan lines as the spinner rotates, the scan beams tracing out scan lines in a scan zone, the multiple laser sources being positioned and oriented such that the angles of reflection of the multiple laser beams from the facets of the rotating spinner result in divergence of the scan lines produced by the reflected scan beams;

a plurality of detectors, each of the detectors being positioned so as to receive reflected light rays representing reflections of a laser beam originating from one of the laser sources;

a collector for collecting and focusing reflected light rays representing reflections of the multiple scan beams from an object within the scan zone, the collector focusing the reflected light rays representing reflections of the multiple scan beams onto the detectors such that reflected light rays representing a reflection of each scan beam are directed to a detector positioned to receive light rays representing a reflection of that scan beam wherein the multiple laser sources comprise at least first and second laser sources for generating first and second laser beams and the first and second laser sources are horizontally offset from one another with respect to the rotating spinner;

pattern mirrors and a scan window, and wherein a pattern mirror directs the first and second laser beams from the rotating spinner out the scan window to the scan zone; and wherein the first and second laser sources are horizontally oriented from one another in opposite directions with respect to the spinner and the collector comprises a reflective ellipse with holes for passage of the first and second laser beams from the first and second laser to the rotating spinner.

2. The bar code scanner of claim 1, wherein the first and second laser beams emerge from the scanner as first and second scan beams and wherein the spinner rotates in the path of the first one scan line as the spinner rotates, wherein the plurality of detectors comprise first and second dual detectors and wherein the collector focuses the reflected light rays representing reflections of the first scan beam onto the first detector and focuses the reflected light rays representing reflections of the second scan beam onto the second detector.

3. The scanner of claim 2, wherein the first and second laser sources are vertically offset from one another with respect to the spinner.

4. The scanner of claim 3, wherein the first and second laser sources are oriented in different vertical directions with respect to the spinner.

5. The scanner of claim 4, wherein the vertical offsets and orientations for the first and second laser sources are chosen so as to produce a specified spacing between pairs of scan lines produced as a facet of the spinner rotates in the paths of the first and second laser beams.

6. The scanner of claim 1, wherein the first and second laser sources are positioned and oriented so that a scan beam produced by the second laser source traces through the same horizontal space as a scan beam produced by the first laser source, the first scan beam leading the second scan beam through the horizontal space.

7. The scanner of claim 6, wherein the first and second laser sources are positioned and oriented so that first and second laser beams produce first and second reflected laser beams exhibiting a similar symmetry as a facet of the spinner rotates in the paths of the first and second laser beams.

8. The scanner of claim 6, wherein the first and second laser sources are dissimilarly focused.

9. The scanner of claim 1, wherein the first and second laser sources are positioned and oriented so as to produce scan lines that are horizontally offset from one another.

10. The scanner of claim 9, wherein the first and second laser beams produce first and second reflected laser beams exhibiting different symmetries as a facet of the spinner rotates in the paths of the first and second laser beams.

11. The scanner of claim 1, wherein the first and second laser beams coincide vertically on an optical element within the scanner and diverge vertically as they move into the scan zone.

12. A method of bar code detection and decoding, comprising the steps of:

generating multiple beams from multiple laser sources placed and oriented with respect to a rotating spinner with a plurality of facets so that each of the multiple laser beams produced by the multiple laser sources will be reflected from a facet of the plurality of facets of the rotating spinner and directed along an optical path to produce a scan beam entering a scan zone, the multiple laser sources being placed and oriented such that the multiple laser beams will be simultaneously directed to a first facet of the plurality of facets of the rotating spinner, the multiple scan beams originating from the multiple laser sources entering a scan zone, the multiple scan beams originating from the multiple laser sources exhibiting a specified minimum separation from one another as a result of divergence of the scan beams resulting from angles of reflection of the multiple laser beams from the first facet of the rotating spinner wherein the multiple laser sources comprise at least first and second laser sources for generating first and second laser beams and the first and second laser sources are horizontally offset from one another with respect to the rotating spinner;

directing the scan beams reflected from the rotating spinner using pattern mirrors out a scan window to the scan zone;

directing reflected light rays representing reflections of the multiple scan beams to a collector comprising a reflective ellipse with holes for passage of the first and second laser beams from the first and second laser to the rotating spinner; and directing light rays representing reflections of the multiple scan beams from the collector to the detectors such that light rays representing reflections of each scan beam are directed to a detector positioned to receive the light rays representing reflections of that scan beam wherein the placement and orientation of the laser sources is performed in such a way that the first and second scan beams trace through the scan zone so as to produce scan lines that are horizontally offset from one another.

13. The method of claim 12, wherein the multiple detectors are first and second detectors, and wherein the step of directing the light rays includes directing reflected light rays representing the first scan beam to a first detector and directing reflected light rays representing the second scan beam to a second detector.

14. The method of claim 13, wherein the placement and orientation of the laser sources is performed in such a way that the first and second scan beams trace through the same horizontal space in the scan zone and the first scan beam leads the second scan beam in tracing through the horizontal space.

15. The method of claim 14, wherein the placement and orientation of the laser sources is performed in such a way that the first and second laser beams are reflected from the spinner so as to produce first and second reflected laser beams exhibiting a similar symmetry as the spinner rotates through a facet of the plurality of facets in the paths of the laser sources.

16. The method of claim 13, wherein the placement and orientation of the laser sources is performed in such a way that the first and second laser beams are reflected from the spinner so as to produce first and second reflected laser beams exhibiting a different symmetries as the spinner rotates through a facet of the plurality of facets in the paths of the laser sources.

17. The method of claim 16, wherein the placement and orientation of the laser sources is performed in such a way as to produce scan lines that are vertically offset from one another.

* * * * *